United States Patent [19]
Lim

[11] Patent Number: 6,005,647
[45] Date of Patent: *Dec. 21, 1999

[54] SHORTING BARS FOR A LIQUID CRYSTAL DISPLAY AND METHOD OF FORMING THE SAME

[75] Inventor: Byoung Ho Lim, Kyungsangbuk-do, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/823,692

[22] Filed: Mar. 25, 1997

[30] Foreign Application Priority Data

Jul. 22, 1996 [KR] Rep. of Korea ..................... 96/29587

[51] Int. Cl.$^6$ ..................... G02F 1/1343; G02F 1/1333
[52] U.S. Cl. ..................... 349/40; 349/139; 349/46
[58] Field of Search ..................... 349/40, 42, 46, 349/139

[56] References Cited

U.S. PATENT DOCUMENTS

| 5,233,448 | 8/1993 | Wu ..................... 349/40 |
| 5,504,348 | 4/1996 | Yoshida et al. ..................... 349/43 |
| 5,650,834 | 7/1997 | Nakagawa et al. ..................... 349/139 |
| 5,657,139 | 8/1997 | Hayshi ..................... 349/40 |
| 5,668,032 | 9/1997 | Holmberg et al. ..................... 349/40 |
| 5,691,787 | 11/1997 | Shimada et al. ..................... 349/40 |
| 5,699,134 | 12/1997 | Takeda et al. ..................... 349/40 |
| 5,748,267 | 5/1998 | Natori et al. ..................... 349/40 |

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

A shorting bar of a liquid crystal display (LCD) is disclosed including a plurality of odd gate lines and a plurality of even gate lines, each having a respective pad region. The plurality of odd gate lines are to a first shorting bar. The plurality of even gate lines are connected to both a second shorting bar connected and a third shorting bar. The resistance of the combined second shorting bar and third shorting bar is substantially similar to the resistance of the first shorting bar.

15 Claims, 8 Drawing Sheets

SHORTING BARS FOR A LIQUID CRYSTAL DISPLAY AND METHOD OF FORMING THE SAME

BACKGROUND OF THE INVENTION

1. Field of the Invention

The present invention relates to a thin film transistor-liquid crystal display (TFT-LCD). Specifically, it relates to a shorting bar for a TFT-LCD where the resistance of the even line shoreline bar and the odd line shorting bar is substantially similar in order to accurately test the TFT-LCD.

2. Discussion of Related Art

Generally, a TFT-LCD includes a bottom plate and a top plate. The bottom plate contains a plurality of pixel regions arranged in a matrix. Each pixel region includes a TFT switching element coupled to an associated pixel electrode. The top plate contains a common electrode and color filter, for displaying colors. A liquid crystal fills the space between the bottom and top plates. Additionally, polarizing plates, connected to both the bottom and top glass plates, polarize visible light rays.

The LCD uses shorting bars to test for poor panels during fabrication. In a conventional LCD the resistance of the shorting bars depends on the area occupied by them. Because even and odd lines are connected to shorting bars of different areas, it is difficult to test the electrical characteristic of an LCD accurately, and thus the detection of poor panels becomes difficult.

A conventional TFT-LCD shorting bar will be explained below with reference to the accompanying drawings. Referring to FIG. 1, a first shorting bar 1 connects to a plurality of odd lines 4 and even lines 5. A cutting region 6 is provided between the plurality of even lines 5 and first shorting bar 1, for separating the shorting bar. A semiconductor line 3 is formed perpendicular to the plurality of odd lines 4 and even lines 5. The semiconductor line 3 exists between first shorting bar 1 and pads associated with the plurality of even lines 5 and odd lines 4. Semiconductor line 3 and the plurality of even lines 5 include a second shorting bar 2. Second shorting bar 2 is connected to the source and drain regions of the plurality of even lines 5 through a chrome layer (not shown in FIG. 1).

A method of forming the plurality of odd lines 4 and shorting bar 1 of the conventional LCD will be explained below. As shown in FIG. 2A, aluminum is deposited on a transparent insulating substrate 10, and patterned to form a gate line 11. As shown in FIG. 2B, gate line 11 is coated with a photoresist that is patterned by exposure and development to overly a portion of gate line 11 corresponding to a pad.

Then, as shown in FIG. 2C, an anodizing oxide layer 12 is selectively formed on an exposed portion of gate line 11 using the photoresist pattern as a mask. After anodizing oxide layer 12 is formed, the photoresist pattern is removed. Next, a silicon nitride layer (SiNx) 13 is formed on the entire surface of substrate 10 including anodizing oxide layer 12. A conventional photolithography process is then carried out to selectively etch the silicon nitride layer using a patterned photoresist layer as a mask. As a result, only a portion of silicon nitride layer 13 remains on anodizing oxide layer 12. An amorphous silicon layer (a-Si:H) 14 is then formed on the overall surface of substrate 10 and selectively etched through photolithography process using a patterned photoresist. Accordingly, amorphous silicon layer 14 is left only on a predetermined portion of silicon nitride layer 13. Amorphous silicon layer 14 corresponds to a location between first shorting bar 1 and odd lines 4.

As shown in FIG. 2D, chrome layers 15a and 15b are formed on the entire surface of substrate 10 and selectively etched through photolithography process using a photoresist. The process forms a second shorting bar 15a and pad 15b. The design of the LCD places shorting bar 15a on a predetermined portion of amorphous silicon layer 14 and pad 15b on a predetermined pad region.

As shown in FIG. 2E, a passivation layer 16 is formed on the overall surface of the substrate and selectively removed, to thereby expose only pad 15b. Then, a conductive layer 17, such as ITO (Indium Tin Oxide), is formed on the entire surface of the substrate and selectively etched, such that only a portion remains on the pad region.

A method of forming the plurality of even lines 5 and second shorting bar 2 of the conventional LCD will be explained below. First of all, as shown in FIG. 3A, aluminum is deposited on transparent insulating layer 10 and patterned, to form gate line 11. As shown in FIG. 3B, a photoresist layer is coated on the entire surface of the substrate and selectively etched. As a result, a photoresist pattern is formed on both the pad region and cutting region 6, shown in FIG. 1.

As shown in FIG. 3C, anodizing oxide layer 12 is formed on an exposed portion of gate line 11 using the photoresist pattern as a mask, and then the photoresist pattern is removed. Silicon nitride layer 13 is formed on the overall surface of the substrate and selectively etched, leaving silicon nitride layer 13 only on anodizing oxide layer 12. Amorphous silicon layer 14 is formed and selectively etched to remain only on a predetermined portion of silicon nitride layer 13. Thus, amorphous silicon layer 14 is located between first shorting bar 1 and the pad region.

As shown in FIG. 3D, chrome layers 15a and 15b are formed on the overall surface of the substrate and patterned, to form a second shorting bar 15a and pad 15b on the pad region. Second shorting bar 15a and pad 15b are connected to each other. As shown in FIG. 3E, gate line 11 is selectively etched in order to form cutting region 6 (shown in FIG. 1). The conventional LCD design places cutting region 6 between first shorting bar 1 (shown in FIG. 1) and amorphous silicon layer 14 (shown in FIG. 3D). Passivation layer 16 is formed on the overall surface of the substrate and selectively etched in order to expose the pad region. A conductive layer 17, such as, for example, ITO, is formed on the overall surface of the substrate and selectively etched; thus, leaving conductive layer 17 only on pad 15b.

The aforementioned shorting bar of the conventional LCD has the following problem. Because the even line shorting bar is much thinner than the odd line shorting bar, the resistance of the even lines becomes larger than that of the odd lines. Accordingly, the IPT test to check the electrical characteristic of a picture of the LCD cannot be accurately carried out. As a result, it is difficult to detect a defective even line.

SUMMARY OF THE INVENTION

Accordingly, the present invention provides a shorting bar of a liquid crystal display that substantially obviates one or more of the problems due to limitations and disadvantages of the related art. Therefore, the present invention includes an odd line shorting bar of substantially the same resistively as an even line shorting bar. This allows accurate testing of a liquid crystal display.

Additional features and advantages of the invention will be set forth in the description which follows, and in part will be apparent from the description, or may be learned by practice of the invention. The objections and other advantages of the invention will be realized and attained by the structure particularly pointed out in the written description and claims hereof as well as the appended drawings.

To achieve these and other advantages and in accordance with the purpose of the present invention, as embodied and broadly described, a shorting bar of a liquid crystal display includes: a first shorting bar connected to a plurality of odd lines, and a second shorting bar connected to a plurality of even lines. The plurality of even lines and odd lines are arranged alternately. A third shorting bar is connected to the second shorting bar at a predetermined position, such that the combined resistance of the second shorting bar and the third shorting bar becomes substantially similar to the resistance value of the first shorting bar.

In another aspect, the present invention provides a method of forming a shorting bar of a liquid crystal display, the method includes forming a gate line on a predetermined portion of a transparent insulating substrate, sequentially forming an anodized and then an insulating layer on a predetermined portion of the gate line, the predetermined portion being a portion other than a cutting region and pad region. A semiconductor layer is formed on a predetermined portion of the insulating layer. The semiconductor layer includes a second shorting bar on a predetermined portion. A third shorting bar is formed on the insulating layer and connected to one side of the second shorting bar. Finally, a passivation layer is placed on a predetermined portion, other than the pad region, which has a conductive layer.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

Figure 1:
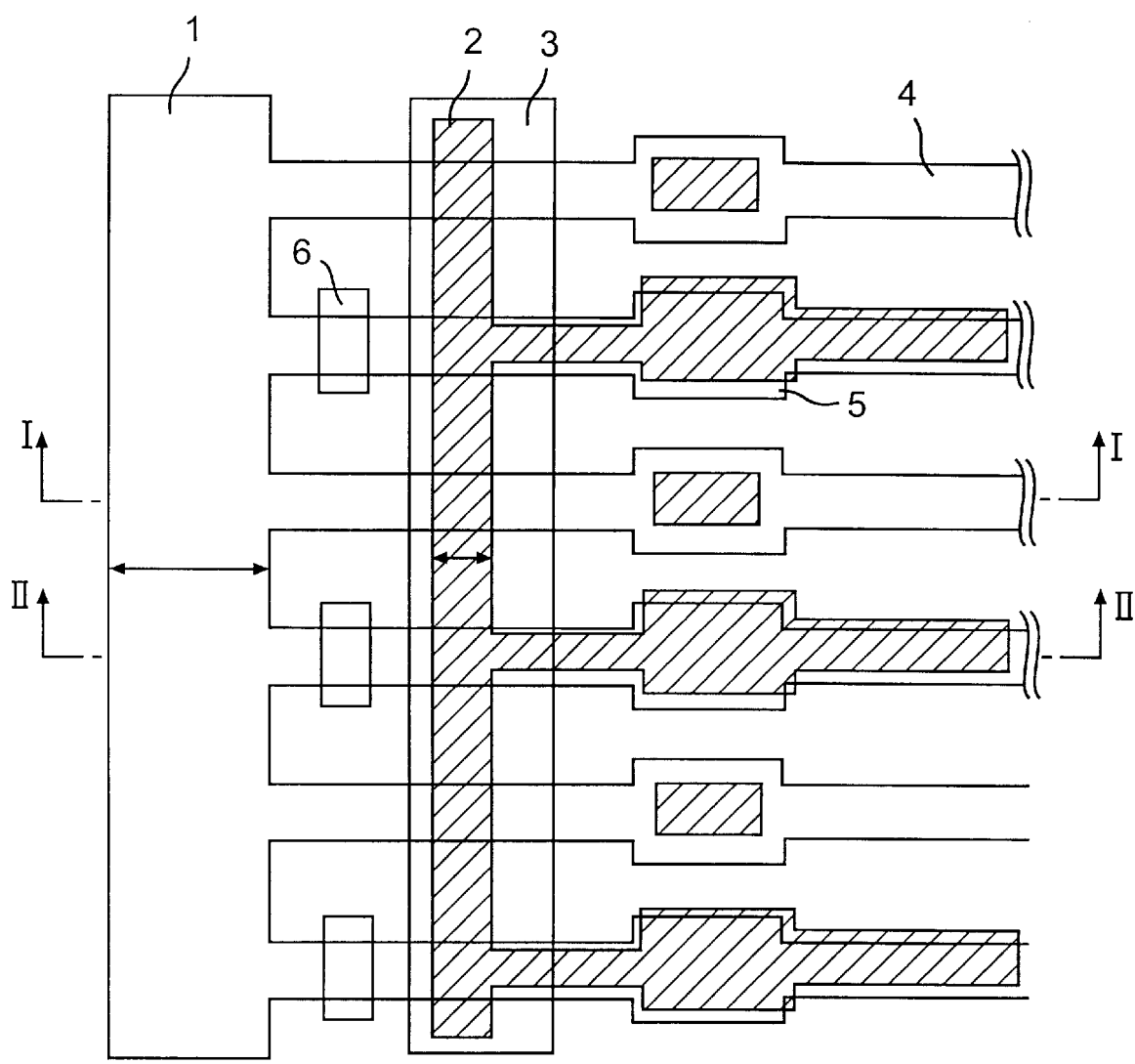
FIG. 1 is a plan view of shorting bar of a conventional TFT-LCD.
Figure 2A:
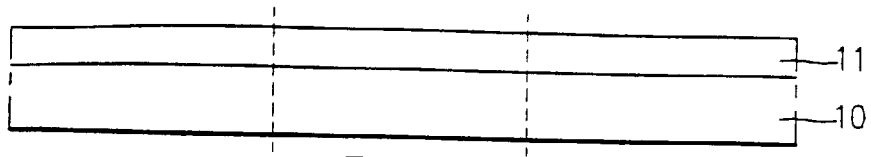
FIGS. 2A to 2E are cross-sectional views showing a process of forming an odd line connected to the shorting bar of the conventional TFT-LCD, taken along line I—I of FIG. 1.
Figure 2B:
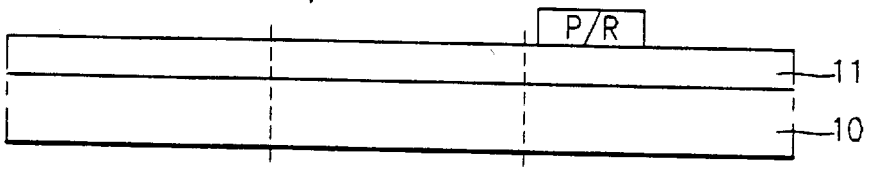
Figure 2C:
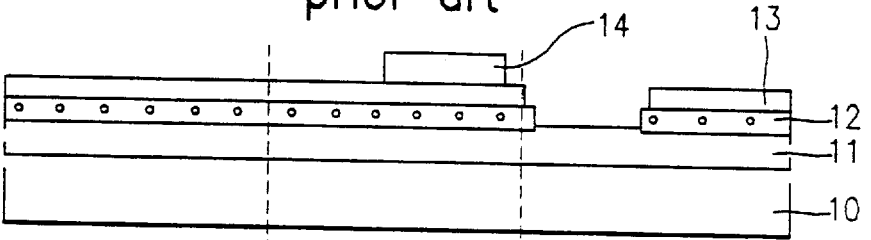
Figure 2D:
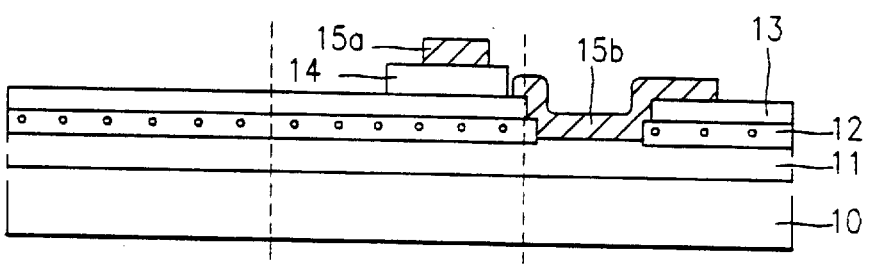
Figure 2E:
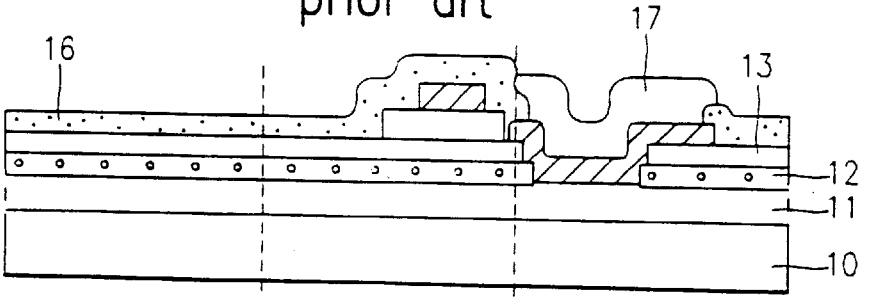
Figure 3A:
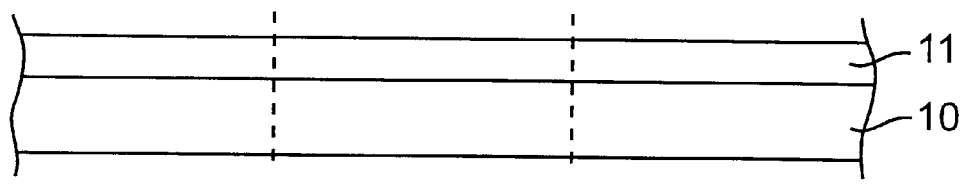
FIGS. 3A to 3E are cross-sectional views showing a process of forming an even line connected to the shorting bar of the conventional TFT-LCD, taken along line II—II of FIG. 1.
Figure 3B:
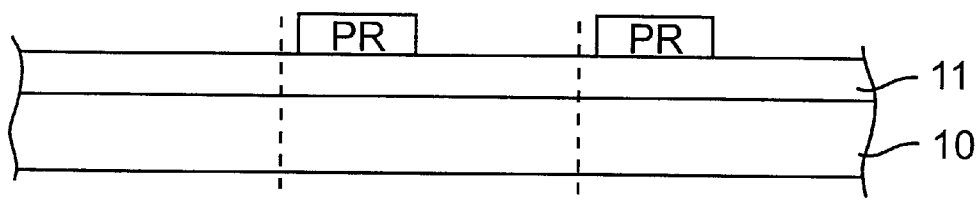
Figure 3C:
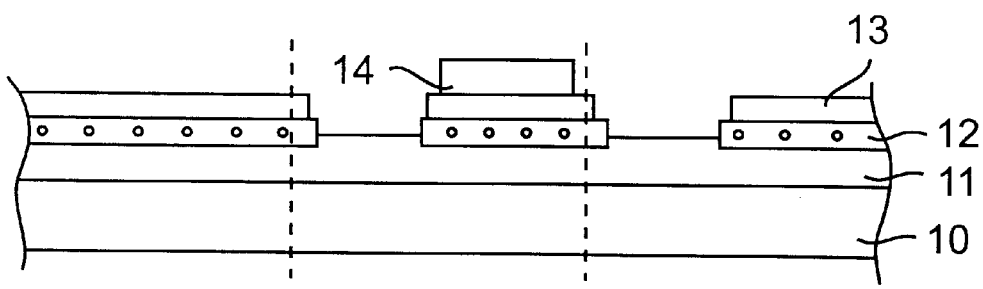
Figure 3D:
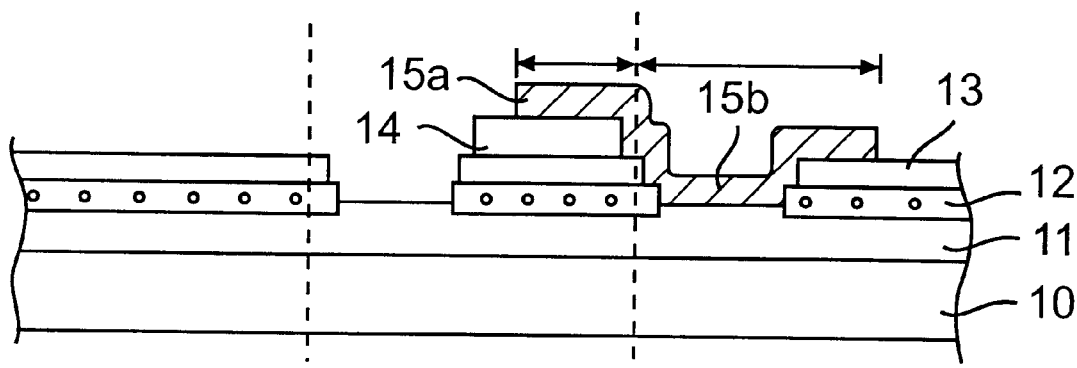
Figure 3E:
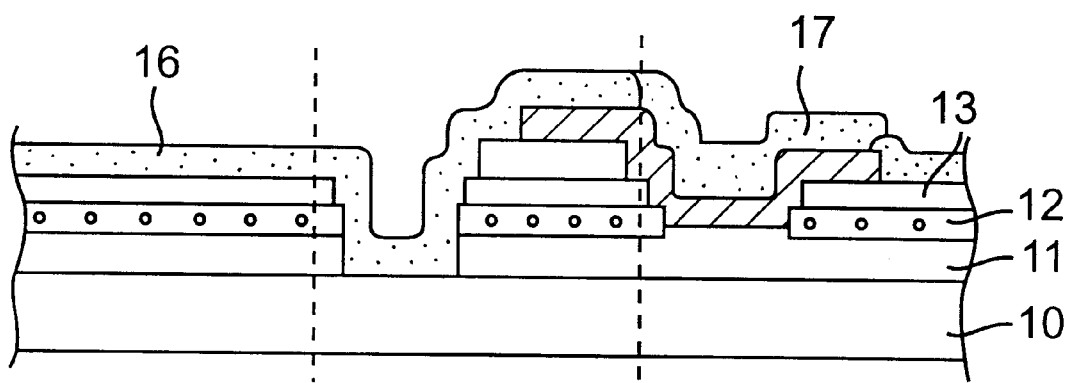
Figure 4:
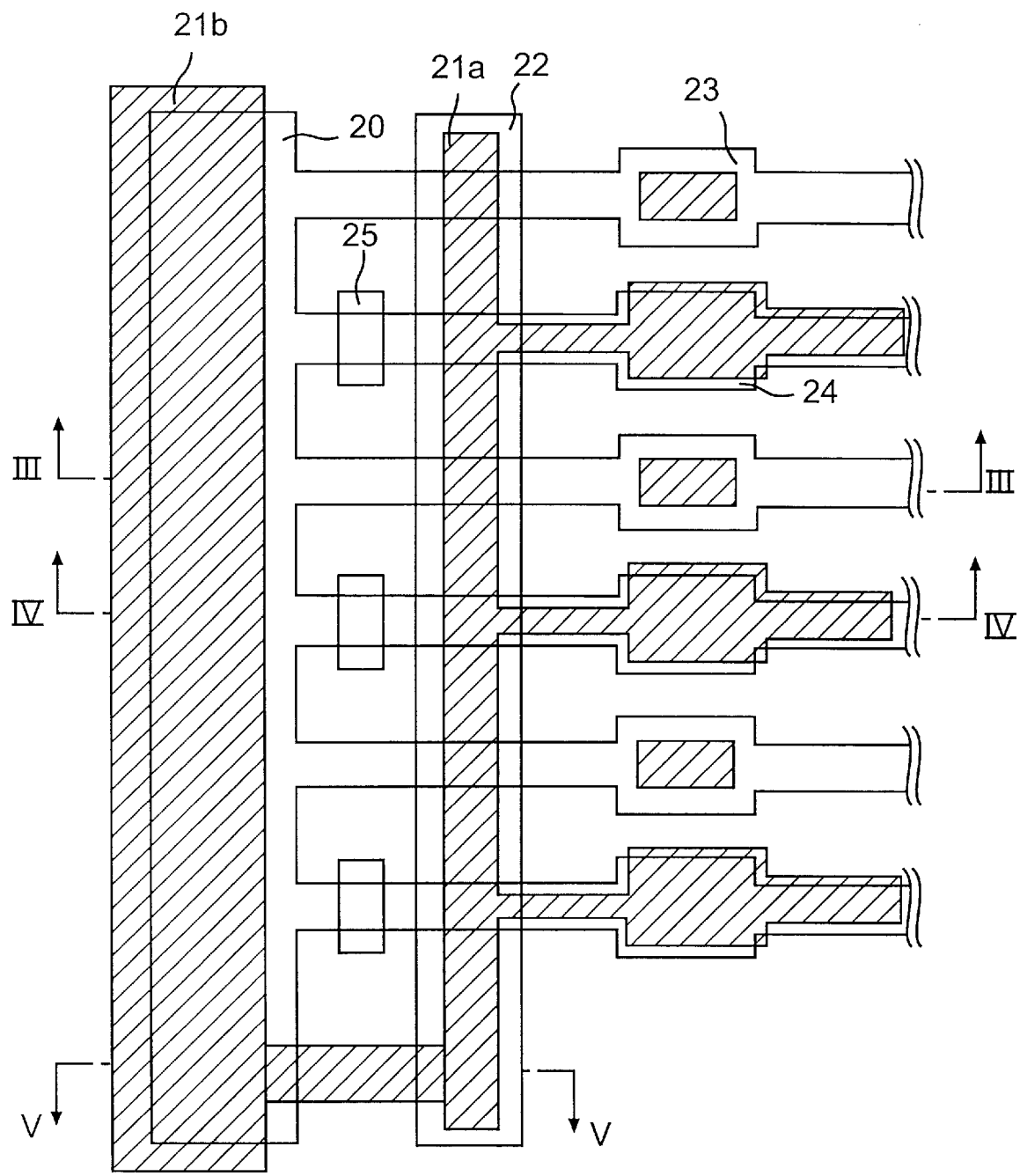
FIG. 4 is a plan view of a shorting bar of a TFT-LCD according to the present invention.

FIG. 4 shows a plan view of shorting bar of a TFT-LCD according to the present invention. Referring to FIG. 4, the TFT-LCD according to the present invention includes a plurality of odd lines 23 and even lines 24 alternately connected to a first shorting bar 20. Cutting regions 25 separate even lines 24 from first shorting bar 20. Even lines 24, however, are connected to a second shorting bar 21a. Second shorting bar 21a, in turn, connects to a third shorting bar 21b at a predetermined position. Here, second shorting bar 21a is formed of a metal layer forming a pad on the plurality of even lines 24 and odd lines 23.

Figure 5A:
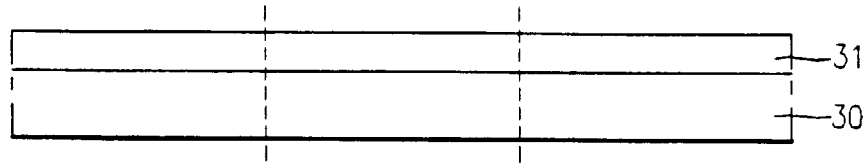
FIGS. 5A to 5E are cross-sectional views showing a process of forming an odd line connected to the shorting bar of the TFT-LCD according to the present invention, taken along line III—III of FIG. 4.
Figure 5B:
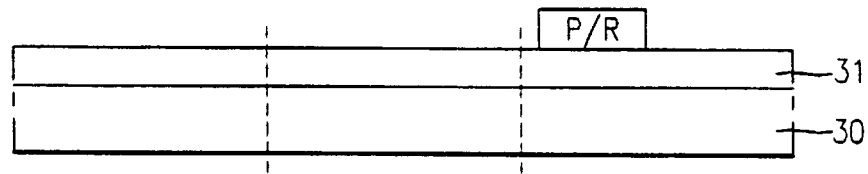

A method of forming the plurality of odd lines 23 connected to first shorting bar 20 of the TFT-LCD will be explained below. Referring to FIG. 5A, aluminum is deposited on a transparent substrate 30, to form a gate line 31. Referring to FIG. 5B, gate line 31 is coated with a photoresist and patterned by exposure and development to form a pad.

Figure 5C:
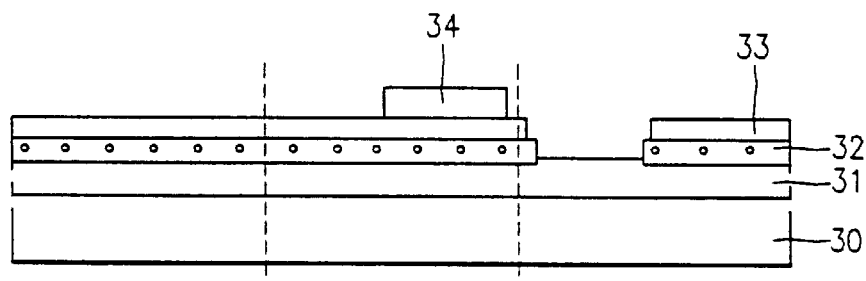

Referring to FIG. 5C, an anodizing oxide layer 32 is formed on an exposed portion of gate line 31 using the photoresist pattern as a mask, and then the photoresist pattern is removed. Thereafter, a silicon nitride layer (SiNx) 33 is formed on the overall surface of substrate 30 including anodizing oxide layer 32. A conventional photolithography process selectively etches, using a photoresist, silicon nitride layer 33 leaving it only on anodizing oxide layer 32. An amorphous silicon layer (a-Si:H) 34 is formed on the overall surface of substrate 30 and selectively etched through a photolithography process, such that amorphous silicon layer 34 is left only on a predetermined portion of silicon nitride layer 33. The design of the LCD places amorphous silicon layer 34 between first shorting bar 20 and the pad region.

Figure 5D:
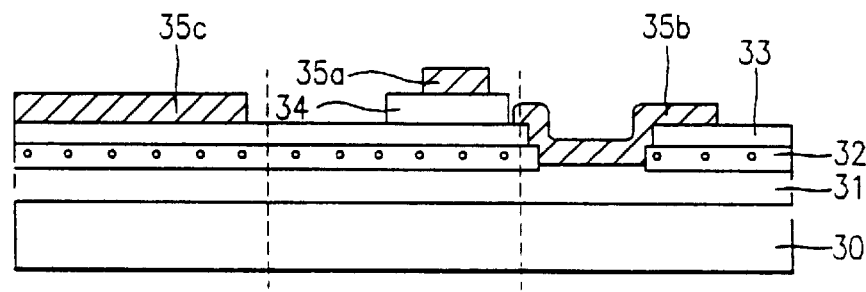

Referring to FIG. 5D, chrome layers 35a and 35b and 35c are formed on overall surface of the substrate 30 and selectively etched through photolithography, using a photoresist. The process forms second shorting bar 35a, pad 35b, and third shorting bar 35c on a predetermined portion of silicon nitride layer 33. The design of the LCD places second shorting bar 35a on an amorphous silicon layer 34, pad 35b on a pad region (not identified), and third shorting bar 35c on first shorting bar 20 as shown in FIG. 4 (second shorting bar 35a and third shorting bar 35c are represented in FIG. 4 as second shorting bar 21a and third shorting bar 21b).

Figure 5E:
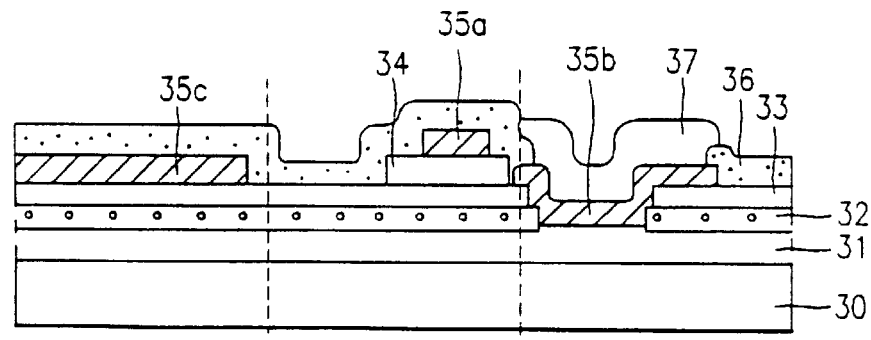

As shown in FIG. 5E, a passivation layer 36 is formed on the overall surface of substrate 30 and selectively etched through photolithography in order to expose pad 35b. A conductive layer 37, such as, for example, ITO, is formed on the overall surface of substrate 30 including passivation layer 36 and selectively etched through photolithography, to thereby form conductive layer 37, such as, for example, ITO, on pad 35b.

Figure 6A:
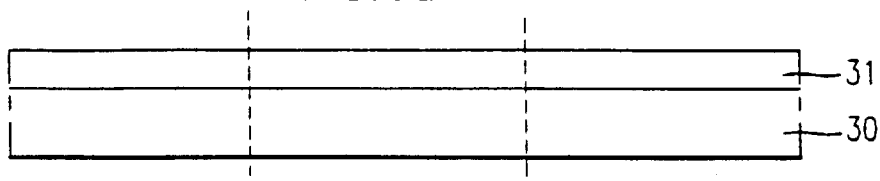
FIGS. 6A to 6E are cross-sectional views showing a process of forming an even line connected to the shorting bar of the TFT-LCD according to the present invention, taken along line IV—IV of FIG. 4.
Figure 6B:
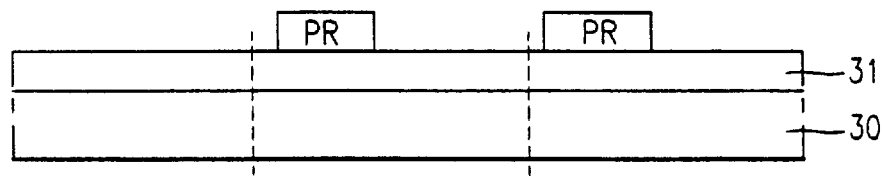

A method of forming the plurality of even lines 24 connected to second shorting bar 21a and a third shorting bar 21b of the LCD will be explained below. As shown in FIG. 6A, aluminum is deposited on transparent insulating substrate 30, to thereby form gate line 31. As shown in FIG. 6B, a photoresist layer is coated on the overall surface of the substrate, including the gate line 31, and patterned by exposure and development to form a pad region and cutting region 25, shown in FIG. 4.

Figure 6C:
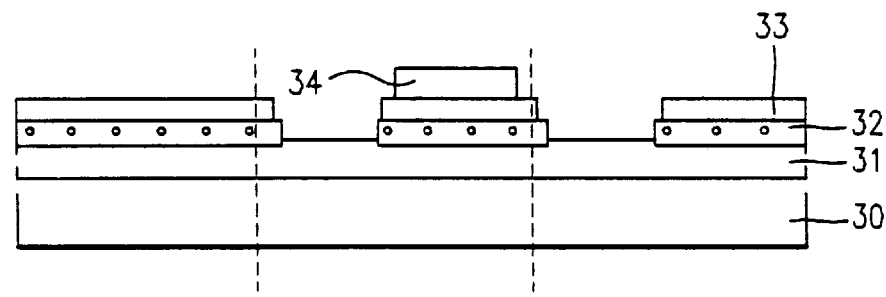

As shown in FIG. 6C, anodizing oxide layer 32 is formed on an exposed portion of gate line 31 using the photoresist pattern as a mask, and then the photoresist pattern is removed. Silicon nitride layer 33 is formed on the overall surface of the substrate. Silicon nitride layer 33 is selectively etched leaving it only on anodizing oxide layer 32. Amorphous silicon layer 34 is formed and selectively etched, also. The LCD design leaves amorphous silicon layer 34 on only a predetermined portion of silicon nitride layer 33. The design places amorphous silicon layer 34 between the pad region and cutting region 25 (shown in FIG. 4, amorphous silicon layer 34 is represented on FIG. 4 as semiconductor 22).

Figure 6D:
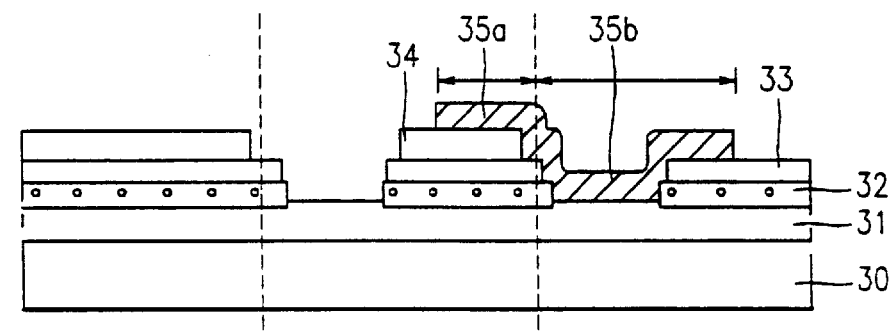

As shown in FIG. 6D, a chrome layer is formed on the overall surface of the substrate and selectively etched using photolithography to form second shorting bar 35a (represented as second shorting bar 21a on FIG. 4) on amorphous silicon layer 34 (represented as semiconductor 22 on FIG. 4) and pad 35b on a predetermined portion the pad region, and third shorting bar 35c (represented as third shorting bar 21b on FIG. 4) on first shorting bar 20.

Figure 6E:
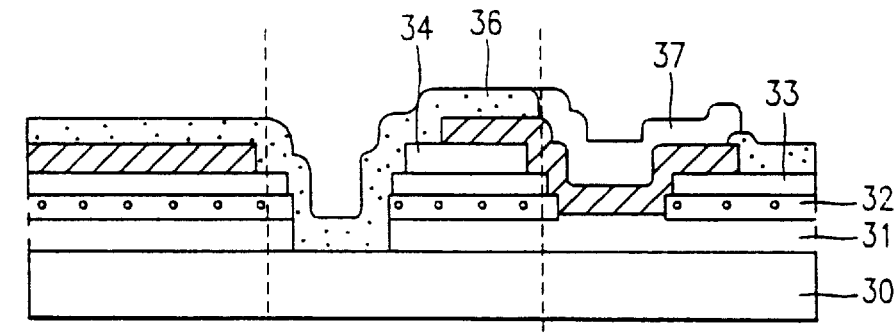

As shown in FIG. 6E, an exposed portion of transparent substrate 30 is selectively etched using photolithography such that passivation layer 36 is formed on the overall surface of substrate 30 and selectively etched to expose pad 35b. Thereafter, a conductive layer 37, such as, for example, ITO, is formed on the overall surface of the substrate including passivation layer 36 and selectively etched through photolithography, to form conductive layer 37 on pad 35b.

Figure 7A:
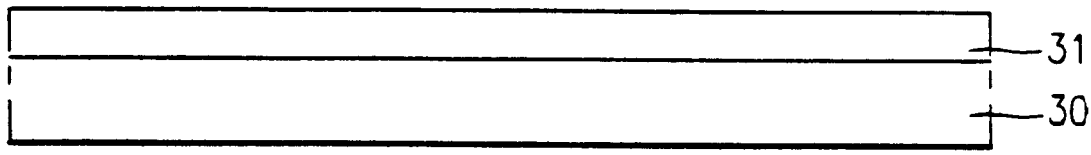
FIGS. 7A to 7C are cross-sectional views showing a process of forming a connecting portion of a second and third shorting bars of the TFT-LCD according to the present invention, taken along line V—V of FIG. 4.
Figure 7B:
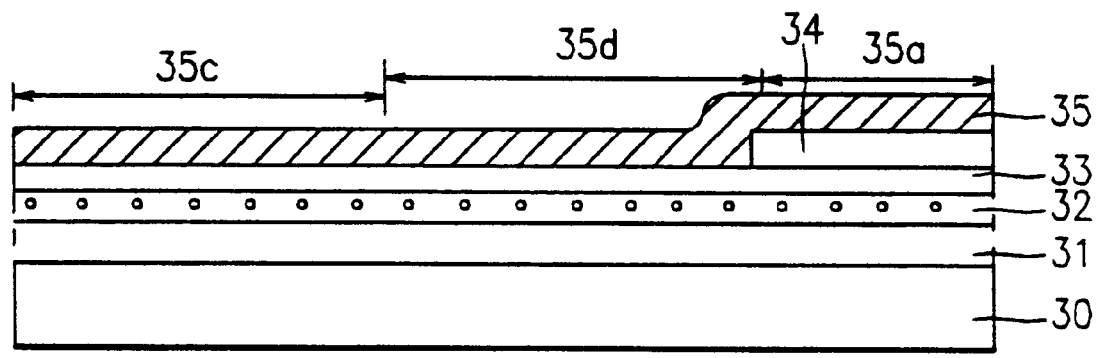

The second and third shorting bars of the TFT-LCD are connected as explained below. As shown in FIG. 7A, an aluminum layer is formed on transparent substrate 30, to form gate line 31. A photoresist pattern is formed on a predetermined portion of gate line 31, and, as shown in FIG. 7b, anodizing oxide layer 32 is formed on an exposed portion of gate line 31 using the photoresist pattern as a mask. The photoresist pattern is then removed leaving anodizing layer 32 on the exposed portion of gate line 31.

Subsequently, silicon nitride layer 33 is formed on anodizing oxide layer 32. Amorphous silicon layer 34 is formed on the overall surface of the substrate including silicon nitride layer 33, and then selectively etched using photolithography. This process leaves amorphous silicon layer 34 on a predetermined region of silicon nitride layer 33. A chrome layer 35 is formed on the overall surface of substrate 30, to form second shorting bar 35a, third shorting bar 35c and a connecting layer 35d for connecting second shorting bar 35a and third shorting bar 35b to each other.

Figure 7C:
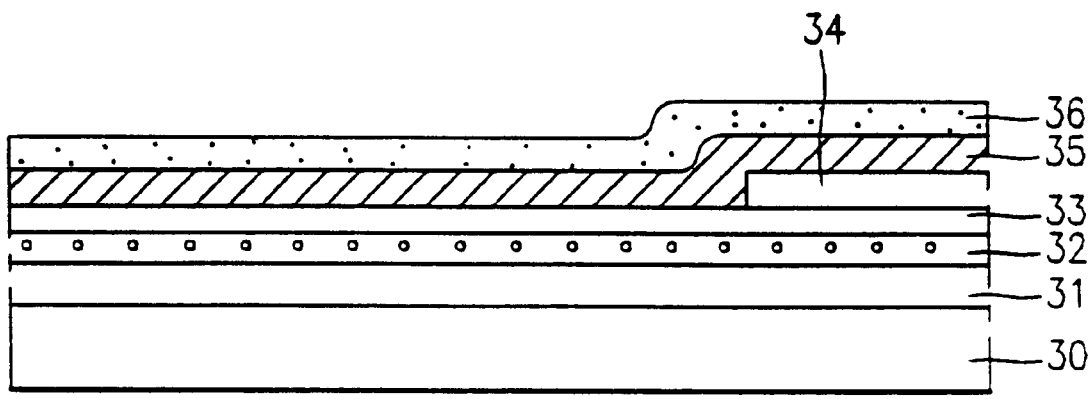

As shown in FIG. 7C, passivation layer 36 is formed on the overall surface of substrate 30. Passivation layer 36 is formed on a portion other than the pad region (not shown on FIG. 7). Here, second shorting bar 35a, the pad of the even line 24, and third shorting bar 35c are patterned from the chrome layer, and third shorting bar 35c is connected to one side of second shorting bar 35a. The combined resistance of second shorting bar 35a and third shorting bar 35c is substantially similar to the resistance of first shorting bar 20.

The shorting bar of the TFT-LCD according to the present invention has the following advantages. As noted above, the conventional TFT-LCD resistance associated with the second shorting bar 2 connected to the plurality of even lines 5 is larger than that of first shorting bar 1 connected to the plurality of odd lines 4 so that the test of the electrical characteristic of the picture is not smoothly carried out, and detecting a defective even line 5 is difficult. However, the present invention connects third shorting bar 21b to second shorting bar 21a. They are, in turn, connected to the plurality of even lines 24. By doing so, the resistance of first shorting bar 20 connected to the plurality of odd lines 23 is substantially similar to that of the combined resistance value of second shorting bar 21a and third shorting bar 21b connected to the plurality of even lines 24. Accordingly, the electrical characteristic test of the LCD picture is uniformly carried out. As a result, defective panels can be accurately identified, and yield can be improved.

It will be apparent to those skilled in the art that various modifications and variations can be made in the shorting bar of a liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a plurality of odd and even lines, alternatingly arranged, having pad regions respectively provided on each of the plurality of odd and even lines;
   a first shorting bar, having a resistance value, connected to the plurality of odd lines;
   a plurality of cutting regions connected to each of the plurality of even lines to separate the plurality of even lines from the first shorting bar; and
   a second shorting bar, having a resistance value, connected to the plurality of even lines; and
   a third shorting bar, having a resistance value, connected to the second shorting bar.

2. The liquid crystal display as claimed in claim 1 wherein the plurality of pad regions, the second, and third shorting bars include chrome.

3. The liquid crystal display in claim 1, wherein the second and third shorting bars have a combined resistance substantially similar to the first shorting bar.

4. A method of forming a liquid crystal display, comprising the steps of:
   forming a first shorting bar;
   forming a plurality of even gate lines and a plurality of odd gate lines on a predetermined portion of a substrate connected to the first shorting bar;
   forming on a predetermined portion of the plurality of odd gate lines an anodizing oxide layer, such that a pad region is left on each of the plurality of odd gate lines;
   forming an insulating layer on the anodizing oxide layer;
   forming an anodizing oxide layer on a predetermined portion of the plurality of even gate lines, such that a pad region and a cutting region are left on each of the plurality of even gate lines, such that the cutting region for separating the first shorting bar from the plurality of even gate lines;
   forming an insulating layer on the anodizing oxide layer;
   forming a semiconductor layer on a predetermined portion of the insulating layer;
   forming a second shorting bar, on a predetermined portion of the semiconductor layer, connected to the plurality of even gate lines;
   forming a third shorting bar, on the insulating layer connected to the second shorting bar;
   forming a passivation layer on a predetermined portion other than the pad region; and
   forming a conductive layer on the pad region.

5. The method as claimed in claim 4, wherein the insulating layer includes silicon nitride.

6. The method as claimed in claim 4, wherein the conductive layer includes ITO.

7. The method as claimed in claim 4, wherein the pad region, the second, and third shorting bars include chrome.

8. A method of forming a liquid crystal display comprising the steps of:

forming a first shorting bar;

forming a plurality of gate lines on a predetermined portion of a substrate such that some of the plurality of gate lines are connected to the first shorting bar;

forming a first insulating layer on predetermined portions of the plurality of age lines, such that a pad region is left on each of the plurality of gate lines;

forming a second insulating layer on said first insulating layer;

forming a semiconductor layer on a predetermined portion of said second insulating layer;

forming a second shorting bar connected to the others of the plurality of gate lines;

forming a passivation layer on a predetermined portion other than the pad region; and forming a conductive layer on the pad region.

9. A method of forming a liquid crystal display comprising the steps of:

forming a first shorting bar on a substrate;

forming a plurality of gate lines on a predetermined portion of the substrate such that some of the plurality of gate lines are connected to the first shorting bar;

forming a first insulating layer on the predetermined portions of the plurality of gate lines, such that a pad region is left on each of the plurality of gate lines;

forming a semiconductor layer on a predetermined portion of said first insulating layer;

forming a second shorting bar connected to the others of the plurality of gate lines;

forming a third shorting bar connected to the second shorting bar, wherein a resistance of the first shorting bar is substantially similar to a resistance of the second shorting bar coupled to the third shorting bar;

forming a second insulating layer on a predetermined portion other than the pad region; and forming a conductive layer on the pad region.

10. A method of forming a liquid crystal display, the method comprising the steps of:

forming a first shorting bar;

forming a plurality of gate lines on a predetermined portion of a substrate such that some of the plurality of gate lines are connected to the first shorting bar;

sequentially forming on a predetermined portion of the plurality of gate lines an anodizing oxide layer, such that a pad region is left on each of the plurality of gate lines, and then forming an insulating layer on the anodizing oxide layer;

forming a semiconductor layer on a predetermined portion of the insulating layer;

forming a second shorting bar, on a predetermined portion of the semiconductor layer, connected to the others of the plurality of gate lines;

forming a third shorting bar, on the insulating layer connected to the second shorting bar, such that a resistance of the first shorting bar is substantially similar to a resistance of the second shorting bar coupled to the third shorting bar;

forming a passivation layer on a predetermined portion other than the pad region; and forming a conductive layer on the pad region.

11. The method as claimed in claim 10, wherein said second and third shorting bars are formed simultaneously.

12. The method as claimed in claim 10, wherein the insulating layer includes silicon nitride.

13. The method as claimed in claim 10, wherein the conductive layer includes ITO.

14. The method as claimed in claim 10, wherein the pad region, the second, the third shorting bars include chrome.

15. The method of forming a liquid crystal display as claimed in claim 8, wherein the first shorting bar includes aluminum.

* * * * *